UNITED STATES PATENT OFFICE.

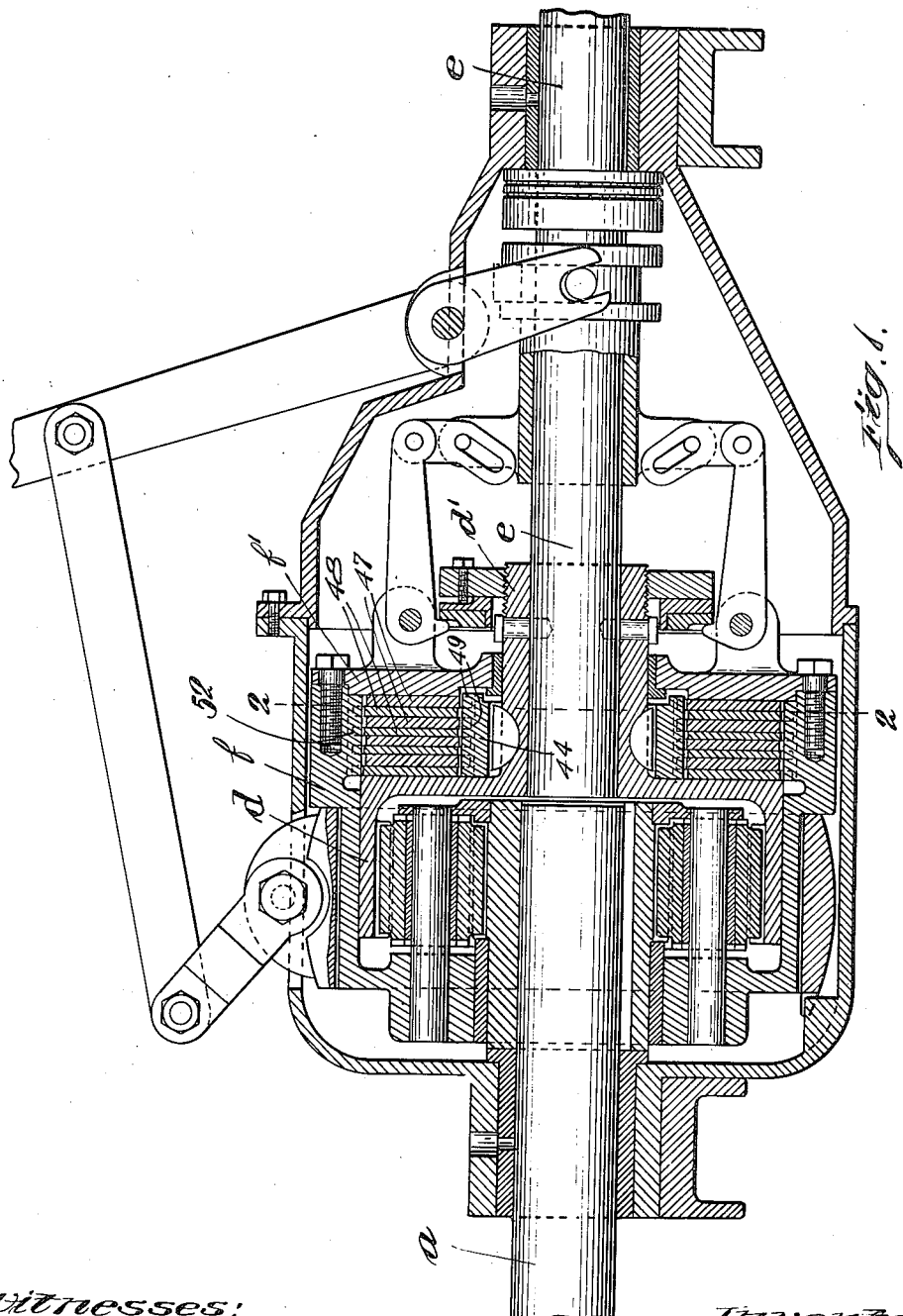

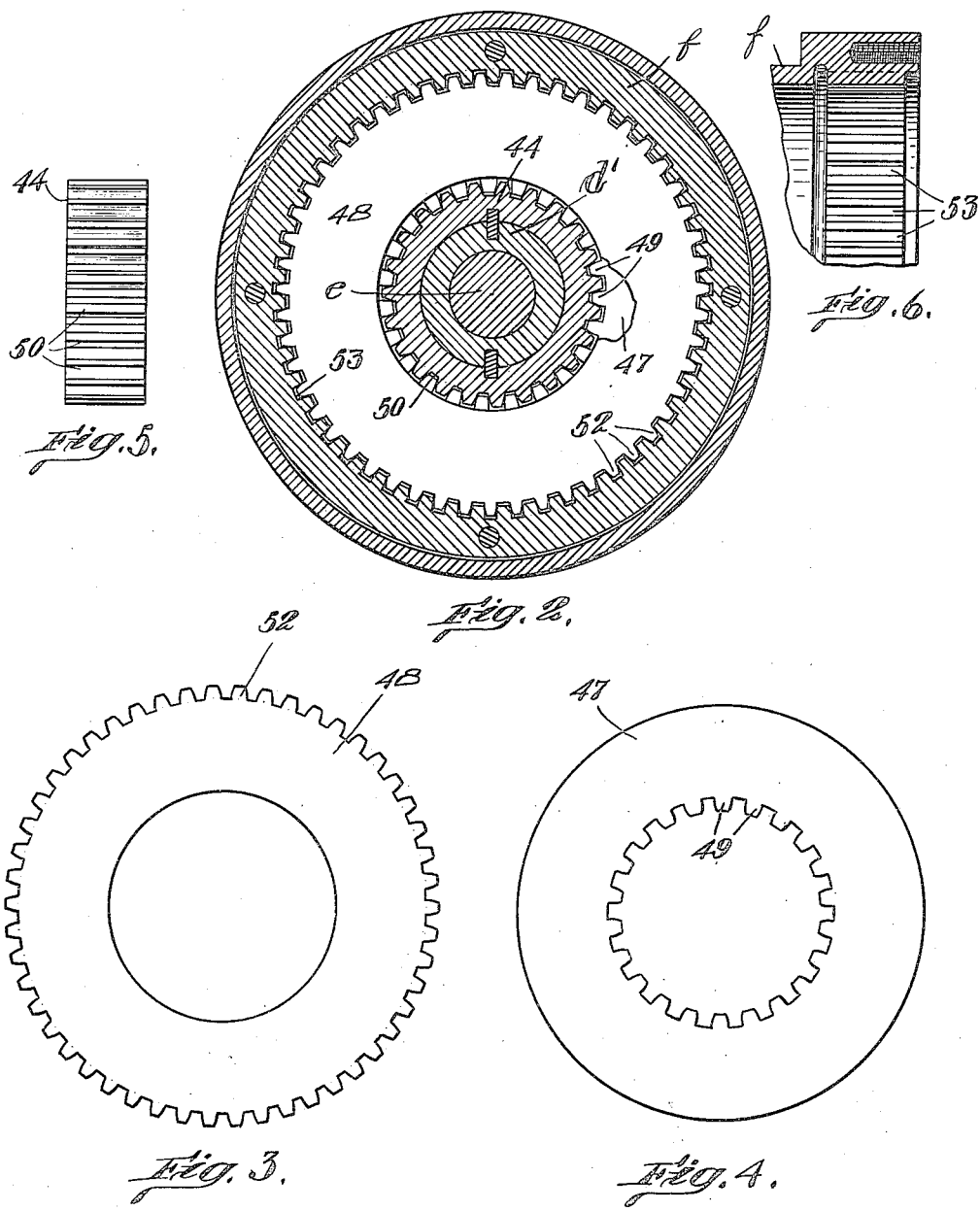

HENRY A. TUTTLE, OF TAUNTON, MASSACHUSETTS, ASSIGNOR TO EVANS STAMPING & PLATING COMPANY, OF TAUNTON, MASSACHUSETTS, A CORPORATION OF MASSACHUSETTS.

CLUTCH MECHANISM FOR REVERSING-GEARING.

1,241,057.  Specification of Letters Patent.  Patented Sept. 25, 1917.

Original application filed May 26, 1911, Serial No. 629,596. Divided and this application filed February 18, 1915. Serial No. 9,140.

*To all whom it may concern:*

Be it known that I, HENRY A. TUTTLE, a citizen of the United States, residing at Taunton, in the county of Bristol and State of Massachusetts, have invented an Improvement in Clutch Mechanism for Reversing-Gearing, of which the following is a specification.

The invention relates to an improvement in clutches designed for connecting a driving-shaft with a driven-shaft, so that the latter may be operated or remain idle as desired, and is shown in my application #629,596, filed May 26, 1911, as applied to reversing gearing, this application being a division of said application.

In clutches as heretofore constructed the clutch-plates have been provided with comparatively wide projections for locking coöperation with correspondingly formed driving and driven members of the clutch, which admit of axial movement of said plates to induce a friction grip between their plane surfaces, for setting or locking the clutch. This formation of the clutch-plates and driving and driven members is objectionable in that it is practically impossible to cut all of the projections with sufficient accuracy so that in the clutching operation all of their edges will engage at the same time. This is particularly difficult when it is considered that if material care is exercised in the formation of these projections and recesses and an exact and accurate fit is secured there is such a resistance between the walls of the projections and recesses as to have a material restraining influence against the axial movements of the clutch-plates, hence interfering with both the operative and inoperative movement of the plates in the clutching operation. To avoid the difficulty described and at the same time provide for more effectively and accurately constructing the clutch-plates and their coöperating members it is contemplated to construct the engaging peripheral edges of said plates as of gear-tooth formation, and the coöperating surfaces of the driven and driving members likewise of gear-tooth formation, that is to say, to provide each element with projections, the contact faces of which have different curvatures, so that engaging portions extend only for a portion of their length.

By forming the edges of the clutch-plates and the surfaces of the coöperating members with such projections I provide an increasing number of interlocking parts which enables the employment of very thin plates; and, furthermore, by reason of the rounded or curved faces of the teeth the clutch plates are adapted to be self-centered and the strain is more equally distributed throughout the entire circumference, and the areas of contact of such faces with the walls of the recesses is reduced, as compared with the projections above referred to, and hence the friction tending to prevent movement of such plates axially is correspondingly reduced. Furthermore, the plates, and the driving and driven-members, which the plates engage, may be easily, quickly and accurately formed, so far as this particular construction is concerned with the usual gear-tooth cutting-machine, and in addition to such convenience the construction will be absolutely uniform one with another and correspondingly accurate.

The formation of the clutch plates and the driving and driven members with projections of gear-tooth formation is a specific embodiment of the present invention, which provides for an interlocking of the parts, while, at the same time, presenting a minimum area of contact to reduce friction when moving the plates axially. Clutch plates having projections constructed with a view to reducing the friction between them and the coöperating driving and driven members, is a salient feature of the present invention, and the formation of gear-teeth on the clutch-plates and coöperating members is noted as a means to this end in that it permits a simple and accurate formation of the clutch-plates with machinery now in use and insures the desired results. It is to be understood, however, that the accepted type of gear-tooth is not the only specific arrangement by which the desired results can be accomplished.

Figure 1, represents a longitudinal vertical section through a reversing-gearing having a clutch embodying this invention.

Fig. 2, is a transverse section on the line 2—2, of Fig. 1.

Figs. 3 and 4, are front elevations respectively of the two different forms of clutch-plates employed.

Figs. 5 and 6, are detail views of the members which are slidably engaged by the clutch-plates.

In the accompanying drawings I have illustrated sufficient elements to show a complete clutch structure, it being understood, however, that aside from the clutch-plates *per se* I contemplate the use of any detail elements necessary or desirable in this connection. For a better understanding of the drawings, however, *a* represents the driving-shaft and *e* the driven-shaft.

Connected in any desired or appropriate manner with the driven-shaft *e* is what may be termed the driven clutch-member, here shown as a collar or ring 44, secured by Woodruff keys to the hub *d'* of an annular gear *d*, which is secured to the driven-shaft. A similar clutch-member is connected to the driving-shaft so that it may be operated thereby continuously, here shown as the cylindrical case *f*, of the pinion-carrier which is connected with the driving-shaft. This connection may be through the medium of reversing-gearing, direct, or in any preferred way. The result of operating these respective clutch-members will have specific relation to their own particular shafts so that when means are provided for interconnecting said members motion will be transmitted from one shaft to the other, as is usual in clutches of this type.

The present invention deals with the clutch-plates 47 and 48, which are arranged between the respective members and designed to form the means whereby said members may be connected to transmit movement from the driving to the driven shaft or freed from such connection to permit the driven shaft to remain at rest, and with the clutch-members *d* and *f* disengaged.

The clutch-plates 47 and 48 of which there may be any desired number, are constructed in the form of annular members having inner and outer peripheral edges. The faces of the clutch-plates are specifically constructed so that when forced into close contact or engagement their surfaces will act as friction binders or in other words the plates are mounted for axial movement and when forced together constitute in effect a single element, as is usual in clutches of this type. Certain of the plates are formed on their inner peripheral edges with interlocking projections 49, and certain of the plates are formed on their outer peripheral edges with corresponding interlocking projections 52. The plates having the inner projections are smooth on their outer edges while those having the outer projections are smooth on their inner edges.

As previously pointed out the particular feature of the present invention resides in the formation of the inner and outer projections of these clutch-plates and the coöperating projections on the driving and driven members. As will be plain from Figs. 3 and 4 of the drawings the inner and outer projections of the clutch-plates are in the form of gear-teeth, that is, each projection is in the form of a gear-tooth preferably cut by the usual gear-cutting machine, so that each tooth is exactly uniform with every other tooth, and said teeth are equally spaced apart. The projections on the members *f* and 44 are likewise formed to provide the recesses 53 and 50, so that the projections on the clutch-plates may intermesh with the projections on said coöperating members. The gear-teeth are of the usual gear-tooth formation in that their contact faces are curved from the base to the end thereof, and when the projections on each element intermesh, it will be observed that the contact-faces thereof have different curvatures, so that a limited contact is obtained, or in other words, the engaging-portions of the contact faces extend only for a portion of their length as contrasted to extending throughout their length. By so forming the contact faces of the projections on the plates and coöperating or supporting members, it will be seen that the clutch-plates will have a tendency to become centered with respect to the coöperating member as soon as strain is brought upon the projections, and this is one of the advantages gained by the employment of projections formed as here shown and described.

A particularly important feature of the present invention is the self-centering of the clutch plates, whereby the strain is equally distributed throughout all the teeth, and buckling or distortion of the plates prevented. The necessary play of the interfitting teeth of the plates and coöperating parts permits the plates to drop slightly when idle, and by reason of the teeth formation initial strain on the plates causes the plates to rise and ride on their tooth formation, until each tooth throughout the series has the same bearing effect. This is readily apparent from the form of the teeth, as the curved formation insures this tendency to self-centering.

It is of course to be understood that any desirable means may be employed for forcing the clutch-plates into frictional clutch coöperation with each other and for relieving such pressure to permit separation of the plates, the means employed in the present instance being illustrated to include a wall $f'$, of the member $f$, and a wall of the member $d$, and means whereby the wall $f'$, may be moved axially to force the clutch-plates into frictional engaging position or to free them of such pressure to permit their independent movement as is necessary in the operation of the clutch.

I claim:—

1. A clutch plate and its coöperating member and intermeshing projections on each element, contact faces of said projections having different curvatures whereby a limited contact between the projections is obtained.

2. A clutch plate and its coöperating member and intermeshing projections on each element, said projections having contact-faces with engaging-portions extending for a portion only of their length, whereby a limited contact between the projections is obtained.

3. A clutch plate and its coöperating member and numerous intermeshing projections on each element, the contact faces of said projections having curvatures with engaging-portions extending for a portion only of their length, which admit of the clutch-plates becoming self-centered, and all of the projections thereof brought into engaging relation with projections on the coöperating member.

4. A clutch including a plurality of annular clutch-plates arranged for axial movement, a coöperating member slidably supporting said plates, and intermeshing projections on each element, said projections having contact-faces with engaging-portions extending for a portion only of their length, whereby a limited contact between the projections is obtained.

5. A clutch including a plurality of annular clutch-plates, two coöperating members, one slidably supporting some of said plates, and the other slidably supporting the remainder of said plates, and intermeshing projections on the clutch-plates and their supports, said projections having contact-faces with engaging-portions extending for a portion only of their length, whereby limited contact is obtained.

In testimony whereof, I have signed my name to this specification in the presence of two subscribing witnesses.

HENRY A. TUTTLE.

Witnesses:
B. J. NOYES,
H. B. DAVIS.